(12) United States Patent
Limketkai et al.

(10) Patent No.: US 9,808,788 B2
(45) Date of Patent: Nov. 7, 2017

(54) METHOD OF USING CYCLODEXTRIN-BASED METAL ORGANIC FRAMEWORKS

(71) Applicant: PanaceaNano, Inc., Aliso Viejo, CA (US)

(72) Inventors: Benjie N. Limketkai, Hesperia, CA (US); Youssry Y. Botros, Aliso Viejo, CA (US)

(73) Assignee: PanaceaNano, Inc., Aliso Viejo, CA (US)

( * ) Notice: Subject to any disclaimer, the term of this patent is extended or adjusted under 35 U.S.C. 154(b) by 0 days.

(21) Appl. No.: 15/179,555

(22) Filed: Jun. 10, 2016

(65) Prior Publication Data

US 2017/0028383 A1 Feb. 2, 2017

Related U.S. Application Data

(60) Provisional application No. 62/198,407, filed on Jul. 29, 2015.

(51) Int. Cl.

| | | |
|---|---|---|
| *B01J 20/34* | (2006.01) | |
| *B01J 20/22* | (2006.01) | |
| *B01D 53/02* | (2006.01) | |
| *C08B 37/16* | (2006.01) | |
| *B01D 53/04* | (2006.01) | |
| *C01B 32/50* | (2017.01) | |

(52) U.S. Cl.
CPC .......... *B01J 20/3425* (2013.01); *B01D 53/04* (2013.01); *B01J 20/226* (2013.01); *B01J 20/3475* (2013.01); *C01B 32/50* (2017.08); *C08B 37/0012* (2013.01); *B01D 2253/204* (2013.01); *B01D 2257/504* (2013.01); *B01D 2259/40083* (2013.01); *Y02C 10/08* (2013.01)

(58) Field of Classification Search
None
See application file for complete search history.

(56) References Cited

U.S. PATENT DOCUMENTS

| | | |
|---|---|---|
| 2,886,446 A | 5/1959 | Kramer et al. |
| 3,258,400 A | 6/1966 | Houlihan |
| 3,920,849 A | 11/1975 | Marmo et al. |
| 3,939,099 A | 2/1976 | Tusa et al. |
| 4,252,986 A | 2/1981 | Klein et al. |
| 4,303,787 A | 12/1981 | Horikoshi et al. |
| 4,384,898 A | 5/1983 | Okada et al. |

(Continued)

FOREIGN PATENT DOCUMENTS

| | | |
|---|---|---|
| CN | 104888235 A | 9/2015 |
| JP | H05-076756 A | 3/1993 |

(Continued)

OTHER PUBLICATIONS

Smaldone, R.A., et al. "Metal-Organic Frameworks from Edible Natural Products" Angew. Chem. Int. Ed., 49:8630-8634 (2010).

(Continued)

*Primary Examiner* — Daniel Berns

(57) ABSTRACT

This disclosure relates to a method that includes (1) contacting a solvent with a porous cyclodextrin-based metal organic framework (CD-MOF) adsorbed with $CO_2$ to release $CO_2$, and (2) collecting the released $CO_2$. The CD-MOF includes at least a metal cation and a plurality of cyclodextrin components.

21 Claims, 2 Drawing Sheets

(56) References Cited

U.S. PATENT DOCUMENTS

| | | |
|---|---|---|
| 4,568,560 A | 2/1986 | Schobel |
| 4,808,232 A | 2/1989 | Beesley |
| 4,835,105 A | 5/1989 | Seres et al. |
| 4,849,400 A | 7/1989 | King |
| 5,051,305 A | 9/1991 | Whitaker, Sr. |
| 5,238,915 A | 8/1993 | Fuwa et al. |
| 6,110,449 A | 8/2000 | Bacon et al. |
| 6,172,037 B1 | 1/2001 | Perring et al. |
| 6,177,413 B1 | 1/2001 | Blahut |
| 6,458,754 B1 | 10/2002 | Velazquez et al. |
| 6,558,706 B2 | 5/2003 | Kantor et al. |
| 8,709,072 B2 | 4/2014 | Rahi et al. |
| 8,871,473 B2 | 10/2014 | Wu |
| 9,085,460 B2 | 7/2015 | Stoddart et al. |
| 9,399,803 B2 | 7/2016 | Stoddart et al. |
| 2003/0092600 A1 | 5/2003 | Shepherd, Jr. |
| 2005/0255069 A1 | 11/2005 | Muller |
| 2008/0054089 A1 | 3/2008 | Oldfield et al. |
| 2008/0206823 A1 | 8/2008 | Jacobson et al. |
| 2011/0052650 A1 | 3/2011 | Morris et al. |
| 2012/0070904 A1 | 3/2012 | Stoddart et al. |
| 2013/0171228 A1 | 7/2013 | Morris |
| 2013/0313193 A1 | 11/2013 | Nair et al. |
| 2014/0105842 A1 | 4/2014 | Pan et al. |
| 2014/0220112 A1 | 8/2014 | Szoka, Jr. et al. |
| 2014/0311297 A1 | 10/2014 | Stoddart et al. |
| 2015/0150981 A1 | 6/2015 | Gref et al. |
| 2015/0322174 A1 | 11/2015 | Stoddart et al. |
| 2017/0203073 A1 | 7/2017 | Dor-Zidon |

FOREIGN PATENT DOCUMENTS

| | | |
|---|---|---|
| WO | WO 2007/035596 A2 | 3/2007 |
| WO | 2016010522 A1 | 1/2016 |

OTHER PUBLICATIONS

Gassensmith, J. J., et al. "Strong and Reversible Binding of Carbon Dioxide in a Green Metal-Organic Framework" Journal of the American Chemical Society 133:15312-15315 (2011).

Forgan, R. S., et al. "Nanoporous Carbohydrate Metal-Organic Frameworks" J. Am. Chem. Soc. 134: 406-417 (2012).

Gassensmith, J. J., et al. "A Metal-Organic Framework-Based Material for Electrochemical Sensing of Carbon Dioxide" J. Am. Chem. Soc. 136:8277-8282 (2014).

Gassensmith, J. J., et al. "A Metal-Organic Framework-Based Material for Electrochemical Sensing of Carbon Dioxide" J. Am. Chem. Soc. pp. S1-S12 (support document).

International Search Report and Written Opinion dated Sep. 8, 2016 in corresponding International application No. PCT/US/16/36862, 14 pages.

Wind, et al.; "Engineering of factors determining a-amylase and cyclodextrin glycosyltransferase specificity in the cyclodextrin glycosyltransferase from Thermoanaerobacterium thermosulfurigenes EM1"; Jan. 6/Feb. 23, 1998; pp. 598-605.

McKinlay, et al.; "BioMOFs: Metal-Organic Frameworks for Biological and Medical Applications"; 2010; pp. 6260-6266.

Liu, et al.; "Second-Sphere Coordination Revisited"; 2014; pp. 315-320.

Liu, et al.; "Extended metal-carbohydrated frameworks"; 2014; pp. 1-14.

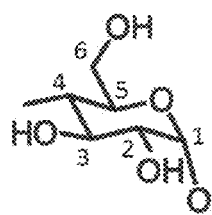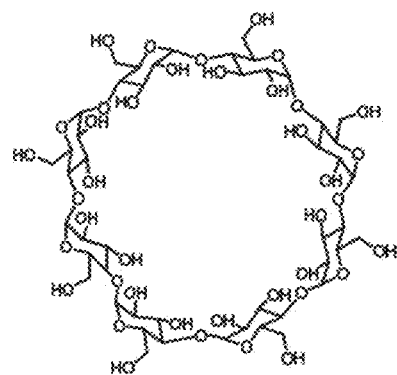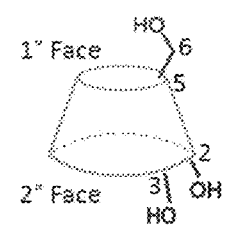
FIG. 1A  FIG. 1B  FIG. 1C
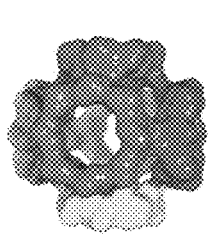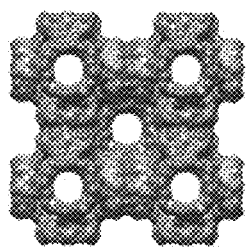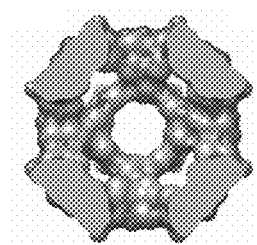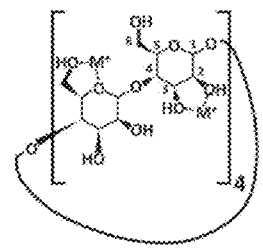
FIG. 2A  FIG. 2B  FIG. 2C  FIG. 2D

METHOD OF USING CYCLODEXTRIN-BASED METAL ORGANIC FRAMEWORKS

CROSS REFERENCE TO RELATED APPLICATION

Pursuant to 35 U.S.C. §119(e), this application claims priority to U.S. Provisional Application Ser. No. 62/198,407, filed Jul. 29, 2015, the contents of which are hereby incorporated by reference.

TECHNICAL FIELD

This invention relates to methods of using cyclodextrin-based metal organic frameworks (CD-MOFs), as well as related systems, components, and products.

BACKGROUND

Sequestration of carbon dioxide from gaseous waste streams has become a pressing issue for the scientific and global community in light of the predicted detrimental effects of anthropogenic $CO_2$ production. Recently, several approaches toward this goal have emerged using metal organic frameworks (MOFs) derived from petrochemical sources. MOFs, also known as coordination polymers or coordination networks, are typically composed of a metal center coordinated to organic linkers to form highly-porous and well-defined crystalline structures that often have much higher surface areas compared to the conventional activated carbon and zeolites. Free hydroxyl and amine residues are known to react with carbon dioxide to form carbonic acids and carbamic acids, respectively. These functionalities have been added to MOFs by rational design of structures. While these advances are noteworthy in their incremental storage capacity, they are generally synthesized from environmentally malevolent materials. Thus, there remains a need to develop functional materials from simple components that are renewable and biocompatible.

SUMMARY

This disclosure is based on the unexpected discovery that $CO_2$ can be readily released from a CD-MOF by contacting a solvent (e.g., an organic solvent, water, or a mixture thereof) with a CD-MOF adsorbed with $CO_2$. The released $CO_2$ can then be collected for use in various applications.

In one aspect, this disclosure features a method that includes (1) contacting a solvent with a porous cyclodextrin-based metal organic framework (CD-MOF) adsorbed with $CO_2$ to release $CO_2$, and (2) collecting the released $CO_2$. The CD-MOF includes at least a metal cation and a plurality of cyclodextrin components.

In another aspect, this disclosure features a method that includes (1) disposing a porous CD-MOF in a gas comprising at least about 0.04% by volume of $CO_2$ to form a CD-MOF adsorbed with $CO_2$, and (2) contacting a solvent with the CD-MOF adsorbed with $CO_2$ to release $CO_2$. The CD-MOF includes at least a metal cation and a plurality of cyclodextrin components.

In still another aspect, this disclosure features a method that includes (1) contacting a solvent with a porous CD-MOF adsorbed with $CO_2$ to release $CO_2$, and (2) collecting the released $CO_2$. The CD-MOF includes at least a metal cation and a plurality of cyclodextrin components. The CD-MOF adsorbed with $CO_2$ includes at least about 4% by weight of $CO_2$.

Embodiments can include one or more of the following features.

In some embodiments, the CD-MOF adsorbed with $CO_2$ can include at least about 4% by weight and/or at most about 10% by weight of $CO_2$.

In some embodiments, the solvent can be $C_{1-10}$ alcohol, $C_{1-10}$ alkane, methylene chloride, water, acetone, acetic acid, acetonitrile, benzene, toluene, dimethylformamide, or a mixture thereof.

In some embodiments, the solvent can be saturated with $CO_2$.

In some embodiments, the solvent can be in the form of a liquid or a vapor.

In some embodiments, the cyclodextrin can be γ-cyclodextrin.

In some embodiments, the metal cation can be a Group I metal cation (e.g., $Na^+$, $K^+$, $Rb^+$, or $Cs^+$), Group II metal cation, or a transition metal cation.

In some embodiments, the method can further include disposing a CD-MOF in a gas comprising at least about 0.04% by volume and/or at most about 25% by volume of $CO_2$ to form the CD-MOF adsorbed with $CO_2$.

In some embodiments, the method can further include transferring the CD-MOF adsorbed with $CO_2$ into a regeneration vessel prior to the contacting step.

In some embodiments, the method can further include removing ambient air from the regeneration vessel comprising the CD-MOF adsorbed with $CO_2$ prior to the contacting step.

In some embodiments, the contacting step can include supplying the solvent to the regeneration vessel containing the CD-MOF adsorbed with $CO_2$.

In some embodiments, the collecting step can include transferring the $CO_2$ released from the contacting step from the regeneration vessel to a condensation vessel.

In some embodiments, the collecting step can further include cooling the $CO_2$ in the condensation vessel or the $CO_2$ released from the contacting step to liquefy the vapor of the solvent in the $CO_2$, and removing the solvent to purify the $CO_2$.

In some embodiments, the collecting step can further include transferring the $CO_2$ from the condensation vessel to a collection vessel by using a compressor.

Other features, objects, and advantages of the invention will be apparent from the description, drawings, and claims.

DESCRIPTION OF DRAWINGS

FIG. 1A illustrates the structure of α-1,4-linked D-glucopyranosyl residue.

FIG. 1B illustrates the structure of a γ-cyclodextrin ring.

FIG. 1C illustrates the eight monosaccharide residues in γ-CD form a truncated cone with the C6 hydroxy (OH) groups constituting the primary (1°) face and the C2 and C3 OH groups constituting the secondary (2°) face.

FIG. 2A illustrates a 3D representation of a CD-MOF having a (γ-CD)$_6$ cube. The primary faces of the γ-CD rings point inwards and secondary faces point outward.

FIG. 2B illustrates a CD-MOF body-centered cubic packing arrangement containing nine (γ-CD)$_6$ cubes.

FIG. 2C illustrates the CD-MOF shown in FIG. 2B in which the pores within the (γ-CD)$_6$ cubes are shown as cut-outs.

FIG. 2D illustrates the structural formula of the CD-MOF unit shown in FIGS. 2B and 2C that contains the alternating coordination of M+ ions to 1) the primary face C6 OH groups and glycosidic ring oxygen atoms and ii) secondary face C2 and C3 OH groups.

Like reference symbols in the various drawings indicate like elements.

DETAILED DESCRIPTION

Figure 3:
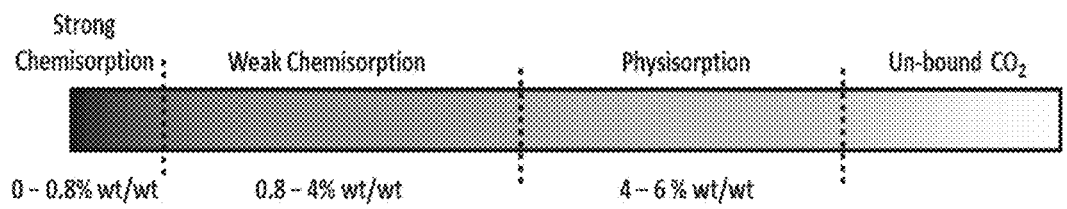
FIG. 3 shows different phases for $CO_2$ binding activity within a CD-MOF porous structure when the CD-MOF is exposed to a gas containing up to 1% by volume $CO_2$ at ambient temperatures and pressures. The amount of $CO_2$ shown in FIG. 3 refers to the percent mass $CO_2$ per unit mass of CD-MOF.

This disclosure generally relates to methods of releasing or collecting $CO_2$ from a CD-MOF by contacting a CD-MOF adsorbed with $CO_2$ with a solvent (e.g., an organic solvent, water, or a mixture thereof).

CD-MOFs

In general, the CD-MOFs that can be used in the methods described herein can be those described in U.S. Pat. No. 9,085,460, the contents of which are hereby incorporated by reference in their entirely.

The CD-MOFs generally include at least one metal cation (e.g., a plurality of metal cations) and a plurality of cyclodextrin components (such as those of Formula (I) below). The at least one metal cation is generally coordinated with the plurality of cyclodextrin molecules or cyclodextrin derivatives. In general, the CD-MOFs are porous.

Suitable metal cations that can be used in the CD-MOFs include Group I metal cations (e.g., $Na^+$, $K^+$, $Rb^+$, or $Cs^+$), Group II metal cations (e.g., $Mg^{2+}$, $Ca^{2+}$, $Sr^{2+}$, or $Ba^{2+}$), and transition metal cations (e.g., $Mn^{4+}$, $Fe^{3+}$, $Co^{2+}$, $Ni^{2+}$, $Cu^{2+}$, or $Zn^{2+}$). The metal cations can be included into the CD-MOFs by using salts or bases as starting materials. Examples of suitable salts include KF, KCl, KBr, $K_2CO_3$, $K_2$(azobenzene-4,4'-dicarboxylate), $Na_2CO_3$, and $NaBPh_4$. Examples of suitable bases include KOH, NaOH, RbOH, and CsOH.

In general, the main building block for CD-MOFs is cyclodextrin (CD), a cyclic oligosaccharide that includes monosaccharide residues linked in a circular ring. Suitable cyclodextrins that can be used in the CD-MOFs include, for example, α-, β- and γ-cyclodextrins. FIG. 1A illustrates the structure of α-1,4-linked D-glucopyranosyl residue. FIG. 1B illustrates the structure of a γ-cyclodextrin ring. FIG. 1C illustrates the eight monosaccharide residues in γ-CD form a truncated cone with the C6 hydroxy (OH) groups constituting the primary (1°) face and the C2 and C3 OH groups constituting the secondary (2°) face. Cyclodextrins can be mass-produced through enzymatic degradation of a renewable source (e.g., starch). In some embodiments, a CD-MOF can be made from one or more cyclodextrin derivatives (such as those shown in Formula (I) below).

Generally, CD-MOFs can be prepared by dissolution of both the cyclodextrin component (e.g., γ-cyclodextrin) and the metal-containing component (such as a metal salt (e.g., KCl) or a base containing a metal cation (e.g., KOH)) in a solvent (e.g., water) in which both have solubility. Isolation of CD-MOFs can be achieved by addition of a poor solvent in which either of the above components has poor solubility. Suitable poor solvents, includes $C_1$-$C_{18}$ alcohols, acetone, tetrahydrofuran, dioxane, acetonitrile, or a mixture thereof.

In some embodiments, CD-MOFs can be prepared by the following method. At ambient temperatures and pressures, γ-CD can be dissolved in an aqueous solution containing an alkali metal cation (e.g., $K^+$), and followed by vapor diffusion of a water-miscible solvent (e.g., methanol) to form millimeter-sized body-centered cubic crystalline structures. Without wishing to be bound by theory, it is believed that the γ-CD rings adopt the faces of a cube, with their primary (1°) faces pointing towards the interior of the cube and their secondary (2°) faces pointing outward. Further, without wishing to be bound by theory, it is believed that the γ-CD rings are linked together by coordination of the alkali metal cations to the primary C6 OH groups and the glycosidic ring oxygen atoms. The individual cubes pack to form the body-centered cubic crystal through coordination of more alkali metal cations to the C2 and C3 OH groups of the secondary faces of the γ-CD rings. FIG. 2A-2D illustrate the CD-MOF geometry with a coordinating alkali metal. Specifically, FIG. 2A illustrates a 3D representation of a CD-MOF having a $(γ\text{-}CD)_6$ cube. The primary faces of the γ-CD rings point inwards and secondary faces point outward. FIG. 2B illustrates a CD-MOF body-centered cubic packing arrangement containing nine $(γ\text{-}CD)_6$ cubes. FIG. 2C illustrates the CD-MOF shown in FIG. 2B in which the pores within the $(γ\text{-}CD)_6$ cubes are shown as cut-outs. FIG. 2D illustrates the structural formula of the CD-MOF unit showing in FIGS. 2B and 2C that contains the alternating coordination of $M^+$ ions to i) the primary face C6 OH groups and glycosidic ring oxygen atoms and ii) secondary face C2 and C3 OH groups.

In some embodiments, the CD-MOFs described herein includes a CD component and a metal-containing component. The metal-containing component can have the formula MN. M can be a Group I, Group II metal or transition metal, and N can be an organic or inorganic, monovalent or multivalent anion. Suitable inorganic anions include, for example, chloride, fluoride, hydroxide, sulfide, sulfinate, carbonate, chromate, and cyanide. Suitable organic anions include, for example, benzoate, azobenzene-4,4'-dicarboxylate, acetate, and oxalate. The CD component of the CD-MOFs can be a compound of the Formula (I):

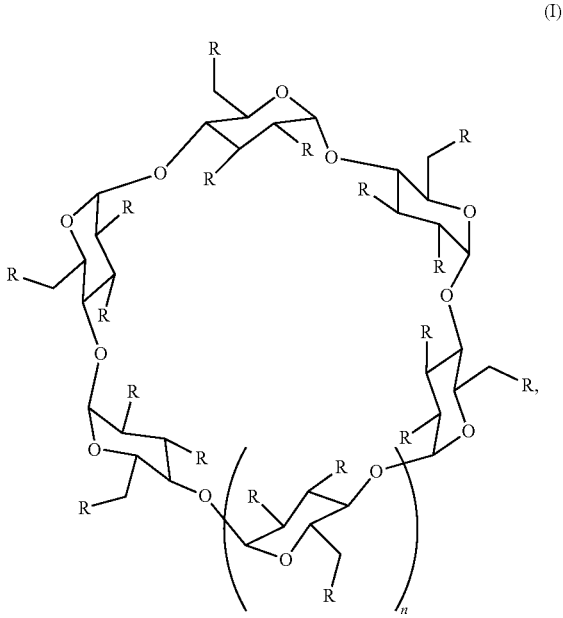

in which n=0-10; R is selected from the group consisting of —OH; —NR'R"; $C_1$-$C_{18}$ alkyl optionally substituted with one, two, three, four or five $R_1$ groups; $C_2$-$C_{18}$ alkenyl optionally substituted with one, two, three, four or five $R_1$ groups; $C_2$-$C_{18}$ alkynyl optionally substituted with one, two, three, four or five $R_1$ groups; $C_1$-$C_{18}$ alkoxy optionally substituted with one, two, three, four or five $R_1$ groups; —S(=O)$_2$R'; —S(=O)OR'; —S(=O)R'; —C(=O)OR'; —CN; —C(=O)R'; —SR', —N=N$^+$=N$^-$; —NO$_2$, —OSO$_2$R'; —C(=O)OR'; —O(=S)SR'; —P(=O)(OR')$_2$; —OP(=O)(OR')$_2$; —P(=O)(OR')R"; —N=R'R"; —NR'P(OR")(OR'''); —OC(=O)NR'R"; aryl optionally substituted with one, two, three, four or five $R_2$ groups; heteroaryl optionally substituted with one, two, three, four or five groups independently selected from $R_2$ groups; and cycloalkyl optionally substituted with one, two, three, four or five groups independently selected from $R_2$ groups; each $R_1$ group is independently selected from the group consisting of hydroxyl, halo, $C_1$-$C_6$ alkoxy, —NR'R"; —S(=O)$_2$R'; —S(=O)OR'; —S(=O)R'; —C(=O)OR'; —CN; —C(=O)R'; —SR', —N=N$^+$=N$^-$; -NO$_2$, —OSO$_2$R'; —C(=O)OR'; —O(=S)SR'; —P(=O)(OR')$_2$; —OP(=O)(OR')$_2$; —P(=O)(OR')R"; —N=R'R"; —NR'P(OR")(OR'''); —OC(=O)NR'R"; aryl optionally substituted with one, two, three, four or five R' groups; heteroaryl optionally substituted with one, two, three, four or five groups independently selected from R' groups; and cycloalkyl optionally substituted with one, two, three, four or five groups independently selected from R' groups; each $R_2$ group is independently selected from the group consisting of $C_1$-$C_6$ alkyl, $C_2$-$C_6$ alkenyl, $C_2$-$C_6$ alkynyl, hydroxyl, halo, $C_1$-$C_6$ alkoxy, —NR'R"; —S(=O)$_2$R'; —S(=O)OR'; —S(=O)R'; —C(=O)OR'; —CN; —C(=O)R'; —SR', —N=N$^+$=N$^-$; —NO$_2$, —OSO$_2$R'; —C(=O)OR'; —O(=S)SR'; —P(=O)(OR')$_2$; —OP(=O)(OR')$_2$; —P(=O)(OR')R"; —N=R'R"; —NR'P(OR")(OR'''); —OC(=O)NR'R"; aryl optionally substituted with one, two, three, four or five R' groups; heteroaryl optionally substituted with one, two, three, four or five groups independently selected from R' groups; and cycloalkyl optionally substituted with one, two, three, four or five groups independently selected from R' groups; and wherein each R', R", and R''' are independently selected from the group consisting of H, $C_1$-$C_6$ alkyl, and aryl. Examples of compounds of Formula (I) include α-, β- and γ-cyclodextrins.

As used herein, the term "alkyl" refers to a straight or branched chain alkyl radical. Examples include, but are not limited, to methyl, ethyl, propyl, isopropyl, n-butyl, sec-butyl, tert-butyl, pentyl, 2-pentyl, isopentyl, neopentyl, hexyl, 2-hexyl, 3-hexyl, and 3-methylpentyl. Each alkyl group may be optionally substituted with one, two or three substituents such as a halo, cycloalkyl, aryl, alkenyl or alkoxy group.

As used herein, the term "alkenyl" refers to a straight or branched hydrocarbon radical having one or two double bonds and includes, for example, ethenyl, propenyl, 1-but-3-enyl, 1-pent-3-enyl, and 1-hex-5-enyl. The alkenyl group can also be optionally mono-, di-, or trisubstituted with, for example, halo, aryl, cycloalkyl or alkoxy.

As used herein, the term "alkynyl" refers to a straight or branched hydrocarbon radical having one or two triple bonds and includes, for example, propynyl and 1-but-3-ynyl. The alkynyl group can also be optionally mono-, di-, or trisubstituted with, for example, halo, aryl, cycloalkyl or alkoxy.

As used herein, the term "alkoxy" refers to an —O-alkyl group in which the alkyl is as defined above.

As used herein, the term "halo" or "halogen" refers to a halogen radical of fluorine, chlorine, bromine, or iodine.

As used herein, the term "aryl" refers to an aromatic carbocylic radical having a single ring (e.g. phenyl), multiple rings (e.g. biphenyl), or multiple fused rings in which at least one is aromatic (e.g. 1,2,3,4-tetrahydronaphthyl).

As used herein, the term "heteroaryl" refers to one aromatic ring or multiple fused aromatic ring systems of 5-, 6- or 7-membered rings containing at least one and up to four heteroatoms (e.g., nitrogen, oxygen or sulfur). Examples include, but are not limited to, furanyl, thienyl, pyridinyl, pyrimidinyl, benzimidazolyl and benzoxazolyl.

As used herein, the term "cycloalkyl" refers to a carbocylic radical having a single ring (e.g., cyclohexyl), multiple rings (e.g., bicyclohexyl) or multiple fused rings (e.g., decahydronaphthalenyl). In addition, the cycloalkyl group may have one or more double bonds.

Adsorption of $CO_2$ by CD-MOFs

In general, the CD-MOFs described herein have a strong preference for $CO_2$ adsorption (e.g., through chemisorption or physisorption). For example, without wishing to be bound by theory, it is believed that $CO_2$ can be captured by the CD-MOFs as a result of chemisorption onto the uncoordinated hydroxyl groups on the CD rings (e.g., γ-CD rings).

The amount of $CO_2$ that can be adsorbed by the CD-MOFs described herein depend on various factors, such as the $CO_2$ concentration of the gas to which the CD-MOFs are exposed. In some embodiments, when the CD-MOF s are exposed to earth atmosphere (which contains about 0.038% by volume of $CO_2$), the CD-MOF s can adsorb about 3-4% by weight of $CO_2$ based on the unit weight of the CD-MOFs. In some embodiments, the CD-MOFs are exposed to a gas containing a $CO_2$ concentration higher than that in the earth atmosphere. Such a gas can include at least about 0.04% by volume (e.g., at least about 0.1% by volume, at least about 0.5% by volume, at least about 1% by volume, at least about 2% by volume, or at least about 5% by volume) and/or at most about 25% by volume (e.g., at most about 20% by volume, at most about 15% by volume, at most about 10% by volume, at most about 5% by volume, or at most about 1% by volume) of $CO_2$. In such embodiments, the CD-MOFs can adsorb at least about 4% by weight (e.g., at least about 4.5% by weight, at least about 5% by weight, at least about 5.5% by weight, or at least about 6% by weight) and/or at most about 10% by weight (e.g., at most about 9% by weight, at most about 8% by weight, at most about 7% by weight, at most about 6% by weight, or at most about 5% by weight) of $CO_2$, based on the unit weight of the CD-MOFs.

It is worth noting that individual CD rings generally do not exhibit any $CO_2$ capture property. Without wishing to be bound by theory, it is believed that, although the surface accessibility of the cyclodextrin hydroxyl groups in the CD-MOF crystal is much higher than in an amorphous cyclodextrin powder, the main reason for the high selective adsorption of $CO_2$ onto CD-MOFs is the broken symmetry and isolation of the OH groups that arises when the other OH groups are preoccupied holding the CD-MOF lattice together through coordination with metal cations. It is believed that the isolated, free hydroxyl groups can serve as reactive hotspots to adsorb $CO_2$ by reversibly binding to the $CO_2$ to form carbonic acid groups.

Without wishing to be bound by theory, it is believed that, the above-mentioned free hydroxyl groups can be fixed in a rigid and highly porous crystalline scaffold, which facilitates easy diffusion of $CO_2$ within the crystal lattice such that $CO_2$ can readily react and bind to the free OH groups. In addition, it is believed that CD-MOFs described herein can be very selective for adsorption of $CO_2$ at low $CO_2$ partial pressures or low $CO_2$ concentration (e.g., in a gas containing less than 1% by volume $CO_2$).

Without wishing to be bound by theory, it is believed that the CD-MOFs described herein can have three phases for $CO_2$ adsorption. FIG. 3 shows different phases for $CO_2$ binding activity within a CD-MOF porous structure when the CD-MOF is exposed to a surrounding gas containing up to 1% by volume $CO_2$ at ambient temperatures and pressures. The amounts of $CO_2$ shown in FIG. 3 refer to the weight percent $CO_2$ per unit weight of the CD-MOF. As shown in FIG. 3, when a CD-MOF is exposed to a gas containing 1% by volume $CO_2$, the first adsorption phase is the initial about 0-0.8 wt % of $CO_2$ adsorbed onto the CD-MOF, which is believed to be bound with strong chemisorption. The second phase is a weak chemisorption of about 0.8-4 wt % of $CO_2$ adsorbed onto the less reactive OH groups in the CD-MOF. It is believed that the $CO_2$ strongly or weakly chemisorbed onto a CD-MOF is not easily released by lowering pressure alone (i.e., a low energy method). The third phase is a weaker physisorption of about 4-6 wt % of $CO_2$, which can be released relatively easily by a reduction in pressure.

According to FIG. 3, about 53% of the $CO_2$ adsorbed from a gas environment having a low $CO_2$ concentration (e.g., less than 1% by volume) is through a weak chemisorption. Without wishing to be bound by theory, it is believed that an advantage of a desorption method described below is that it can readily release the $CO_2$ adsorbed onto a CD-MOF through weak chemisorption by using simple steps at a low cost. By contrast, a conventional method either is not able to release the $CO_2$ adsorbed through weak chemisorption (e.g., by pressure reduction) or requires a large consumption of energy to release the $CO_2$ adsorbed through weak chemisorption (e.g., by increasing temperature). As a result, the desorption methods described herein can be advantageously used to release the $CO_2$ adsorbed through weak chemisorption to collect $CO_2$ from a gas environment having a low $CO_2$ concentration (e.g., the gas environment near a coal-based emission source).

Desorption of $CO_2$ from CD-MOFs

In general, one can use the desorption methods described herein to release the $CO_2$ adsorbed onto CD-MOFs. In some embodiments, the methods include (1) contacting a solvent with a porous CD-MOF adsorbed with $CO_2$ to release $CO_2$; and (2) collecting the released $CO_2$. The CD-MOF can be those described above.

In some embodiments, the solvent can be an organic solvent, an inorganic solvent, or a mixture thereof. Examples of suitable organic solvents include $C_{1-10}$ alcohol, $C_{1-10}$ alkane, methylene chloride, acetone, acetic acid, acetonitrile, benzene, toluene, dimethylformamide, or a mixture thereof. Examples of suitable inorganic solvents include water, and aqueous solutions (e.g., those containing one or more organic or inorganic solutes).

In some embodiments, the solvent used the desorption methods described herein can be in the form of a liquid or a vapor. When the solvent is in the form of a vapor, the vapor can be obtained from a liquid solvent (e.g., by heating or reduced pressure) and brought into contact with the CD-MOF.

In some embodiments, the solvent used the desorption methods described herein can be saturated with $CO_2$. Without wishing to be bound by theory, it is believed that the solvent releases $CO_2$ from the CD-MOF adsorbed with $CO_2$ by a mechanism (e.g., disrupting the binding of $CO_2$ with the CD-MOF) in addition to dissolving $CO_2$ in the solvent. Without wishing to be bound by theory, it is believed that an advantage of using a solvent saturated with $CO_2$ is that it can be recycled for further use without the need to remove any $CO_2$ dissolved in the solvent, thereby significantly reducing the costs of collecting and storing $CO_2$.

In some embodiments, the desorption methods can further include a step of disposing a porous CD-MOF in a gas containing at least about 0.04% by volume of $CO_2$ (i.e., a gas having a $CO_2$ concentration higher than that in the earth atmosphere) to form a CD-MOF adsorbed with $CO_2$. Such a gas can be a waste gas from a conventional post-combustion carbon capture and storage (CCS) system, or a gas emitted from or surrounding a coal-based $CO_2$ emission source (e.g., a coal-based power plant). The CD-MOF can be included in an open container (e.g., a canister) to adsorb the $CO_2$ in the gas. In some embodiments, the gas to which the CD-MOF is exposed is at an ambient temperature and pressure.

In some embodiments, a pH indicator can be used to detect whether the CD-MOF has adsorbed a sufficient amount of $CO_2$ so that it is ready to be regenerated. The pH indicator can be embedded in the CD-MOF and can change color upon the formation of the carbonic acid when the $CO_2$ gas is adsorbed onto the CD-MOF crystal. Such a pH indicator can serve as an in-situ $CO_2$ sensor to indicate when the CD-MOF needs to be regenerated. As an example, methyl red, a zwitterionic azobenezene-based pH indicator, can be diffused into the pores of a CD-MOF during synthesis. The CD-MOF with the embedded methyl red pH indicator but without $CO_2$ has a yellow color due to the interstitial OH— counter ions within the CD-MOF that creates a basic environment. When $CO_2$ is captured and forms carbonic acid groups, an acidic environment is created, thereby changing the color of the CD-MOF to red. Once it is indicated that the adsorption is completed, the container containing the CD-MOF adsorbed with $CO_2$ can be sealed and transported to a facility to regenerate the $CO_2$ adsorbed by the CD-MOF.

In some embodiments, after the CD-MOF adsorbed with $CO_2$ is formed, it can be transferred into a regeneration vessel. Optionally, after the CD-MOF adsorbed with $CO_2$ is transferred into the regeneration vessel, the ambient air can be removed from the regeneration vessel, e.g., by reducing the pressure in the regeneration vessel. Without wishing to be bound by theory, it is believed that reducing the pressure in the regeneration vessel can remove the ambient air in the regeneration vessel and/or a certain amount of $CO_2$ adsorbed on the CD-MOF through physisorption, but does not substantially remove $CO_2$ adsorbed on the CD-MOF through chemisorption. Thus, it is believed that this optional step can significantly increase the purity of the $CO_2$ obtained from contacting the CD-MOF adsorbed with $CO_2$ with a solvent as the $CO_2$ thus obtained would not include a substantial amount of ambient air in the regeneration vessel.

In some embodiments, after the optional step of removing the ambient air in the regeneration vessel, a solvent can be transferred into the regeneration vessel to contact the CD-MOF adsorbed with $CO_2$, thereby regenerating the $CO_2$ from the CD-MOF. In such embodiments, the $CO_2$ released from the above step can be transferred out of the regeneration vessel into a condensation vessel.

In some embodiments, the condensation vessel can be cooled so that, once the $CO_2$ is transferred into the condensation vessel, the vapor of the solvent in the $CO_2$ can be liquefied and then removed to further purify the $CO_2$. The $CO_2$ thus obtained can then be transferred to a collection vessel using a compressor for storage purposes. The collected $CO_2$ can be used in various industrial or consumer applications (e.g., to make dry ice or soda).

In some embodiments, the CD-MOF and solvent used in the desorption methods described herein can be recycled without the need of further purification. For example, the CD-MOF can be directly reused in a gas having a higher $CO_2$ concentration than earth atmosphere even though it includes a residual amount of $CO_2$. As another example, as noted above, the solvent can be reused in the desorption methods described herein without the need to remove any $CO_2$ dissolved in the solvent.

It is believed that the methods described herein have relatively low costs at least because the CD-MOFs and solvents used the methods can be recycled easily. It is also believed that the methods described herein are environmental friendly at least because the CD-MOFs are obtained from renewable resources and are biodegradable. Further, it is believed that the methods described herein are particularly suitable for capturing $CO_2$ from a gas having a low $CO_2$ concentration (e.g., containing less than about 25% by volume or less than about 1% by volume of $CO_2$) because the CD-MOFs can adsorb a relatively large amount of $CO_2$ in such a gas and because these methods consume a relatively small amount of energy to capture and regenerate $CO_2$, thereby resulting in a relatively high energy efficiency. By contrast, a conventional method would either be impractical or would have a very low energy efficiency because they require use of a relative large amount of energy (e.g., by heating) to collect a relatively small amount of $CO_2$ (as the gas the adsorbent is exposed to has a low $CO_2$ concentration).

Figure 4:
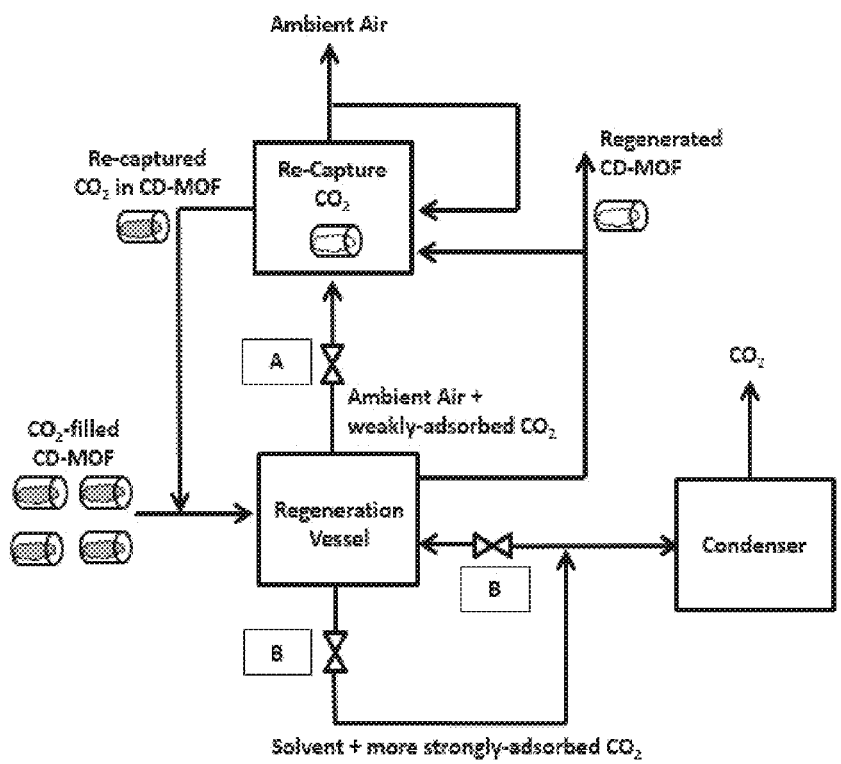
FIG. 4 shows an exemplary regeneration process to release $CO_2$ from CD-MOF adsorbent by using a solvent.

FIG. 4 illustrates an exemplary process for regenerating $CO_2$ from a $CO_2$-filled CD-MOF in containers. As shown in FIG. 4, once the $CO_2$-filled CD-MOF containers are transferred into a regeneration vessel, two steps (i.e., steps A and B) can occur. Step A is the evacuation of the regeneration vessel (e.g., by slightly lowering the pressure in the vessel) to remove the ambient air in the vessel, which may also include other gases such as $N_2$, $O_2$, and $CH_4$ (e.g., if the CD-MOF containers are taken from capture sites located near coal beds). For example, the pressure of the regeneration vessel can be lowered from ambient pressure (i.e., about 101 kPa) to about 10-100 kPa. As noted above, it is believed that step A may remove a certain amount of $CO_2$ adsorbed on the CD-MOFs through physisorption, but does not substantially remove $CO_2$ adsorbed on the CD-MOFs through chemisorption. The amount of the $CO_2$ in the gas removed in step A can be monitored by using gas chromatography.

In some embodiments, the $CO_2$ removed in step A can be recovered by contacting the gas obtained from step A with a fresh CD-MOF in a recycle/re-capture process. For example, the $CO_2$ removed in step A can be transferred into a condenser containing a freshly-made CD-MOF or a regenerated CD-MOF that does not include a substantial amount of $CO_2$. The $CO_2$ removed in step A can then be captured by the CD-MOF, which can be regenerated by the desorption methods described herein.

In some embodiments, step A can be performed before the $CO_2$-filled CD-MOF is transferred into the regeneration vessel. In some embodiments, step A is optional and can be omitted.

Step B is the introduction of a solvent (e.g., methanol), either as a liquid or through vapor diffusion, to release the weakly-chemisorbed $CO_2$ from CD-MOFs for collection. As shown in FIG. 3, the majority of adsorbed $CO_2$ in CD-MOFs is held by weak chemisorption. Thus, step B is the main step that regenerates most of the $CO_2$ from $CO_2$-filled CD-MOFs. The amount of the $CO_2$ in the gas exiting the regeneration vessel can be monitored by using gas chromatography. As shown in FIG. 4, the $CO_2$ exiting the regeneration vessel can be delivered to a condenser in which any solvent vapor in the $CO_2$ can be liquefied and removed. The $CO_2$ exiting the condenser can then be collected and stored. The regenerated CD-MOF can then be reused to capture $CO_2$ in a suitable gas.

In some embodiments, one can release and collect $CO_2$ by dissolving the CD-MOF adsorbed with $CO_2$ in water or an aqueous solution. In such embodiments, as the CD-MOF is dissolved and forms CD molecules, all of the $CO_2$ adsorbed by the CD-MOF is released. The released $CO_2$ can be dissolved in the water or aqueous solution. Once the water or aqueous solution is saturated with $CO_2$, any extra $CO_2$ can be released to the surround environment and collected. The CD dissolved in the water or aqueous solution can be recycled and reused to form a CD-MOF, e.g., by using the methods described herein.

For example, as shown in FIG. 4, a suitable amount of water can be added to the regeneration vessel to dissolve the CD-MOF adsorbed with $CO_2$. The amount of the water can be no more than the amount needed to dissolve the CD-MOF to reduce the amount of the $CO_2$ dissolved in the water. The $CO_2$ released from this step can be transferred from the regeneration vessel to a condenser (in which the water vapor in the $CO_2$ can be liquefied and removed), and subsequently to a collection vessel. The CD dissolved in the water in the regeneration vessel can be recycled and reused to form a CD-MOF.

Other embodiments are within the scope of the following claims.

What is claimed is:
1. A method, comprising:
contacting a solvent with a porous cyclodextrin metal organic framework (CD-MOF) adsorbed with $CO_2$ to release $CO_2$; and
collecting the released $CO_2$, wherein the CD-MOF includes metal cations and a cyclodextrin, the cyclodextrin having the formula:

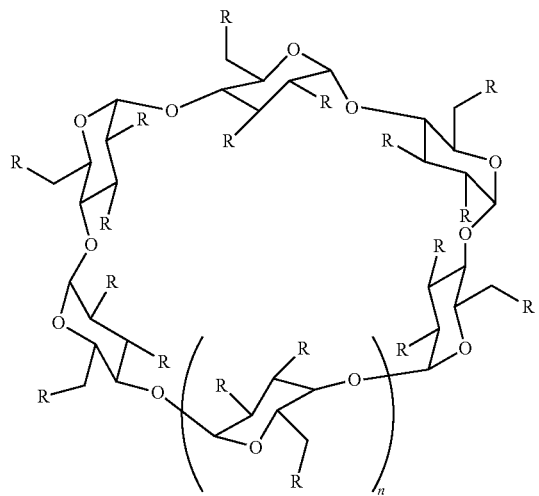

wherein n is an integer ranging from 0 to 10; R is an —OH group, and, the metal cations coordinate to a primary face C6 —OH group and glycosidic ring oxygen atom of glycosidic rings of the cyclodextrin, or, to secondary face C2 and C3 —OH groups of alternating glycosidic rings of the cyclodextrin.

2. The method of claim 1, wherein the CD-MOF adsorbed with $CO_2$ comprises at least about 4% by weight of $CO_2$.

3. The method of claim 1, wherein the CD-MOF adsorbed with $CO_2$ comprises at most about 10% by weight of $CO_2$.

4. The method of claim 1, wherein the solvent is $C_{1-10}$ alcohol, $C_{1-10}$ alkane, methylene chloride, water, acetone, acetic acid, acetonitrile, benzene, toluene, dimethylformamide, or a mixture thereof.

5. The method of claim 1, wherein the solvent is saturated with $CO_2$.

6. The method of claim 1, wherein the solvent is in the form of a liquid or a vapor.

7. The method of claim 1, wherein the cyclodextrin is γ-cyclodextrin.

8. The method of claim 1, wherein the metal cations are Group I metal cations, Group II metal cations, or transition metal cations.

9. The method of claim 8, wherein the CD-MOF further includes an anion wherein: the metal cations and the anion have a formula MN, where M is one of the metal cations and N is an organic or inorganic monovalent or multivalent anion.

10. The method of claim 1, wherein, prior to the contacting step, the method further comprises disposing a CD-MOF in a gas comprising at least about 0.04% by volume of $CO_2$ to form the CD-MOF adsorbed with $CO_2$.

11. The method of claim 10, wherein the gas comprises at most about 25% by volume of $CO_2$.

12. The method of claim 10, further comprising transferring the CD-MOF adsorbed with $CO_2$ into a regeneration vessel prior to the contacting step.

13. The method of claim 12, further comprising removing ambient air from the regeneration vessel comprising the CD-MOF adsorbed with $CO_2$ prior to the contact step.

14. The method of claim 12, wherein the contacting step comprises supplying the solvent to the regeneration vessel comprising the CD-MOF adsorbed with $CO_2$.

15. The method of claim 14, wherein the collecting step comprises transferring the $CO_2$ released from the contacting step from the regeneration vessel to a condensation vessel.

16. The method of claim 15, wherein the collecting step further comprises cooling the $CO_2$ in the condensation vessel to liquefy the vapor of the solvent in the $CO_2$, and removing the solvent to purify the $CO_2$.

17. The method of claim 16, wherein the collecting step further comprises transferring the $CO_2$ from the condensation vessel to a collection vessel by using a compressor.

18. A method, comprising:
disposing a porous cyclodextrin metal organic framework (CD-MOF) in a gas comprising at least about 0.04% by volume of $CO_2$ to form a CD-MOF adsorbed with $CO_2$; and
contacting a solvent with the CD-MOF adsorbed with $CO_2$ to release $CO_2$, wherein the CD-MOF includes metal cations and a cyclodextrin, the cyclodextrin having the formula:

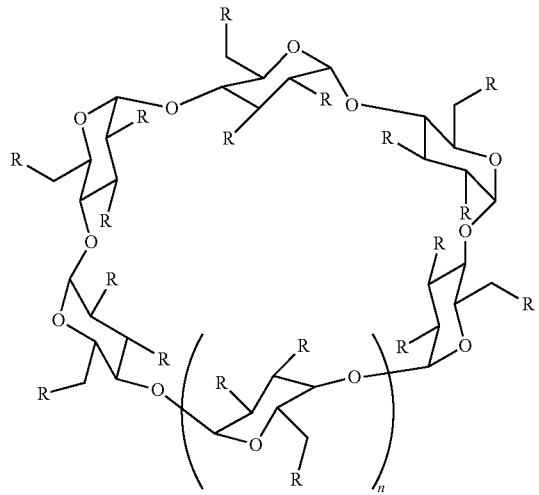

wherein n is an integer ranging from 0 to 10; R is an —OH group, and, the metal cations coordinate to a primary face C6 —OH group and glycosidic ring oxygen atom of glycosidic rings of the cyclodextrin, or, to secondary face C2 and C3 —OH groups of alternating glycosidic rings of the cyclodextrin.

19. The method of claim 18, wherein the gas comprises at most about 25% by volume of $CO_2$.

20. A method, comprising:
contacting a solvent with a porous cyclodextrin metal organic framework (CD-MOF) adsorbed with $CO_2$ to release $CO_2$, the CD-MOF adsorbed with $CO_2$ comprises at least about 4% by weight of $CO_2$; and
collecting the released $CO_2$, wherein the CD-MOF includes metal cations and a cyclodextrin, the cyclodextrin having the formula:

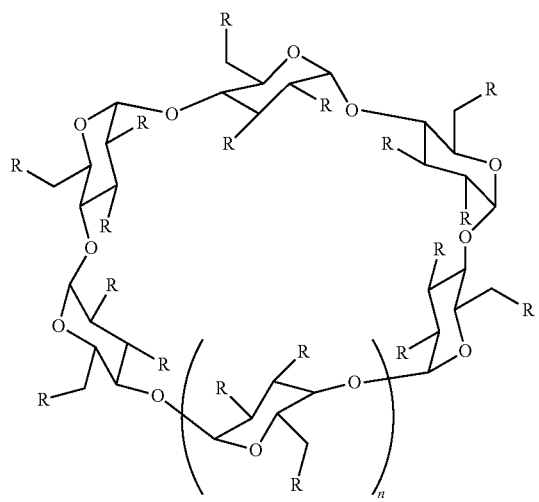

wherein n is an integer ranging from 0 to 10; R is an —OH group, and, the metal cations coordinate to a primary face C6 —OH group and glycosidic ring oxygen atom of glycosidic rings of the cyclodextrin, or, to secondary face C2 and C3 —OH groups of alternating glycosidic rings of the cyclodextrin.

21. The method of claim 20, wherein the collecting step comprises cooling the $CO_2$ released from the contacting step to liquefy the vapor of the solvent in the $CO_2$, and removing the solvent to purify the $CO_2$.

* * * * *